(12) United States Patent
Guignard

(10) Patent No.: US 10,400,747 B2
(45) Date of Patent: Sep. 3, 2019

(54) SAVONIUS ROTOR

(71) Applicants: UNIVERSITÉ D'AIX-MARSEILLE, Marseilles (FR); CENTRE NATIONAL DE LA RECHERCHE SCIENTIFIQUE, Paris (FR)

(72) Inventor: Stéphan Norbert Guignard, Saint Rémy de Provence (FR)

(73) Assignees: UNIVERSITÉ D'AIX-MARSEILLE, Marseilles (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 379 days.

(21) Appl. No.: 15/300,169

(22) PCT Filed: Mar. 31, 2015

(86) PCT No.: PCT/FR2015/050837
§ 371 (c)(1),
(2) Date: Sep. 28, 2016

(87) PCT Pub. No.: WO2015/150697
PCT Pub. Date: Oct. 8, 2015

(65) Prior Publication Data
US 2017/0138344 A1  May 18, 2017

(30) Foreign Application Priority Data

Mar. 31, 2014 (FR) ..................... 14 52798

(51) Int. Cl.
| F03D 3/06 | (2006.01) |
| F03B 17/06 | (2006.01) |
| F03B 13/10 | (2006.01) |

(52) U.S. Cl.
CPC .............. *F03D 3/067* (2013.01); *F03B 13/10* (2013.01); *F03B 17/065* (2013.01);
(Continued)

(58) Field of Classification Search
CPC .. F03D 3/067; F03D 3/068; F03B 3/14; F03B 17/065; F05B 2240/213; F05B 2240/311
See application file for complete search history.

(56) References Cited

U.S. PATENT DOCUMENTS

| 4,424,451 A * | 1/1984 | Schmidt ................ F03B 17/065 290/54 |
| 6,283,711 B1 * | 9/2001 | Borg ....................... F03D 3/065 416/135 |
| 2012/0280510 A1 * | 11/2012 | Hwang ................... F03D 3/067 290/55 |

FOREIGN PATENT DOCUMENTS

| CN | 101341332 A | 1/2009 |
| JP | 2009-203968 A | 9/2009 |

(Continued)

OTHER PUBLICATIONS

Jul. 8, 2015 International Search Report issued in International Patent Application No. PCT/FR/050837.
(Continued)

*Primary Examiner* — David E Sosnowski
*Assistant Examiner* — Brian P Wolcott
(74) *Attorney, Agent, or Firm* — Oliff PLC

(57) ABSTRACT

A rotor including blades rotating around a rotation axis (X), each blade being configured to transmit to the rotation axis, during a revolution of the rotor around the rotation axis, under the effect of the flow of a fluid, alternately a driving torque that rotates the rotor, and a resistant torque tending to go against the rotation of the rotor, each blade including in a region of an outer longitudinal edge of the blade, a flexible part configured to retract towards the inside of the rotor, when the blade transmits the resistant torque to the rotation axis of the rotor, and to switch to a position extended towards the outside of the rotor, during the rotor half-revolution following a maximum retraction position, when the blade transmits the driving torque to the rotation axis of the rotor, the flexible part being driven only under the effect of the flow of the fluid.

18 Claims, 8 Drawing Sheets

(52) U.S. Cl.
CPC ..... *F05B 2210/16* (2013.01); *F05B 2240/213* (2013.01); *F05B 2240/301* (2013.01); *F05B 2240/311* (2013.01); *F05B 2240/313* (2013.01); *Y02E 10/223* (2013.01); *Y02E 10/28* (2013.01); *Y02E 10/74* (2013.01)

(56) References Cited

FOREIGN PATENT DOCUMENTS

| | | | |
|---|---|---|---|
| JP | 2009-209728 A | | 9/2009 |
| JP | 2009209728 A | * | 9/2009 |
| KR | 2012-0027335 A | | 3/2012 |
| WO | 2007/071249 A1 | | 6/2007 |
| WO | 2010/131891 A2 | | 11/2010 |
| WO | 2012/117272 A2 | | 9/2012 |

OTHER PUBLICATIONS

May 17, 2018 Office Action issued in Chinese Patent Application No. 201580028080.4.

Oct. 4, 2016 International Preliminary Report on Patentability issued in International Patent Application No. PCT/FR2015/050837.

* cited by examiner

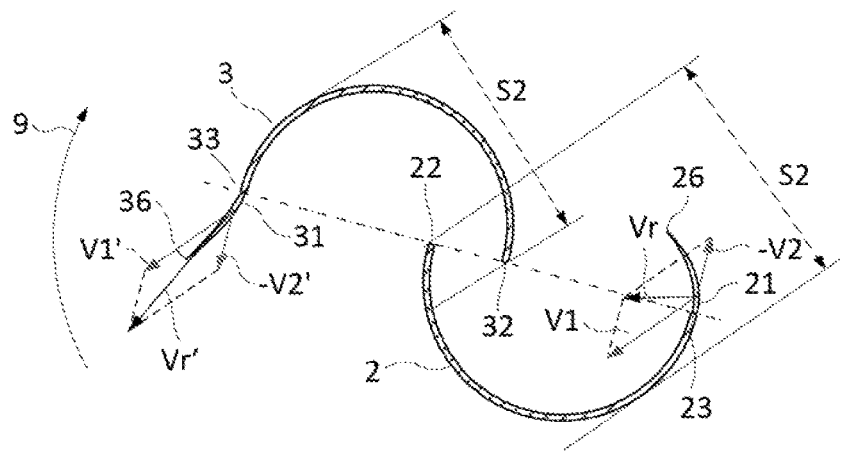
Fig. 4A
Fig. 4B
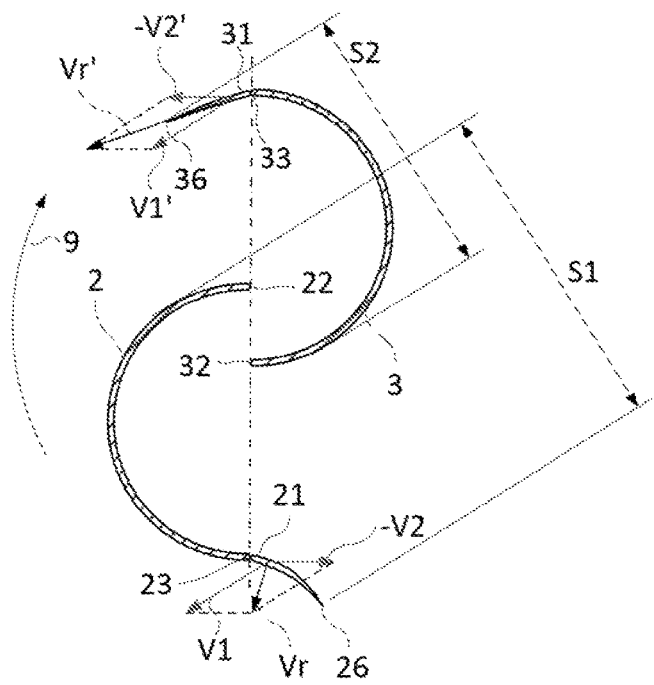
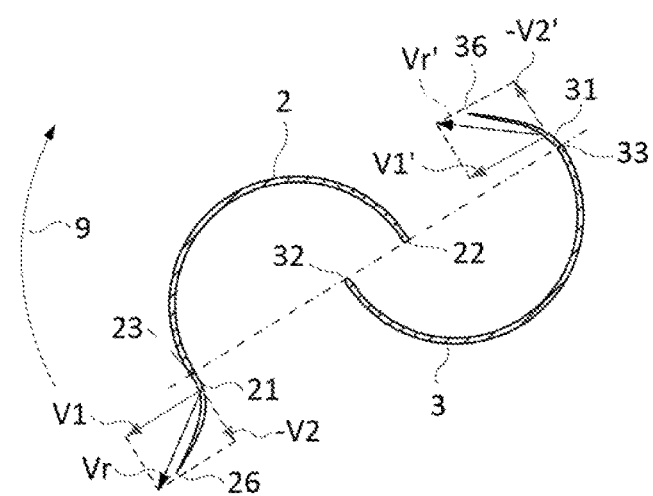
Fig. 4C

SAVONIUS ROTOR

BACKGROUND OF THE INVENTION

Field of the Invention

The present invention relates to a rotor used in wind turbines or underwater generators, and in particular rotors comprising blades that, under the effect of a fluid flow, transmit to the rotation axis of the rotor during a revolution around this axis, alternately a driving torque that rotates the rotor, and a resistant torque, going against the rotation of the rotor. Thus, this invention relates more particularly, but not exclusively, to rotors with an axis not parallel to the direction of flow of the fluid, such as Savonius rotors.

Related Art

A Savonius rotor classically comprises two or more rigid blades, of semi-cylindrical shape, disposed symmetrically around the rotation axis of the rotor. The diameter of each of the blades is between the radius and the diameter of the rotor. When the diameter of the blades is greater than the radius of the rotor, the concave faces of the blades partially face each other in pairs.

Savonius rotors offer the advantage of providing a high torque upon starting and thus of being capable of starting with low fluid flow velocities. Rotors of this type also offer performances independent of the direction of flow of the fluid in a plane perpendicular to the axis of the rotor, and are relatively small. Their optimal rotation speed is relatively low, of the order of the flow velocity of the fluid at the outer end of the blades. By comparison, Darreius-type wind turbines, that also have a vertical axis, have a speed at the end of blades of the order of five times the flow velocity of the fluid. For wind turbines with a horizontal axis, this speed is of the order of ten times the flow velocity of the fluid. Savonius rotors are thus less sensitive to possible impacts of objects against the blades and are little risky for objects in motion in the flow. The main drawback of this type of rotor lies in their relatively low performance. They also have a variable torque during a blade revolution, and a relatively high weight.

It has been shown that a two-blade Savonius rotor has a maximum performance when the distance between the inner longitudinal edges of the two blades is of the order of one sixth of the diameter of the rotor defined by the distance between the outer longitudinal edges of the two blades. Even when this condition is met, the performance of such a rotor remains low.

It can thus be desirable to improve the performance of a Savonius rotor. It is also desirable to define a Savonius rotor structure that is robust and little sensitive to the presence of debris in the fluid, while having a low manufacturing cost.

BRIEF SUMMARY OF THE INVENTION

Some embodiments relate to a rotor comprising two blades rotating around a rotation axis, each blade being configured to transmit to the rotation axis, during a revolution of the rotor around the rotation axis, under the effect of the flow of a fluid, alternately a driving torque that rotates the rotor around the rotation axis, and a resistant torque tending to go against the rotation of the rotor around the rotation axis. According to one embodiment, each of the two blades comprises in a region of an outer longitudinal edge of the blade, a flexible part configured to retract towards the inside of the rotor, when the blade transmits the resistant torque to the rotation axis of the rotor, and to switch to a position extended towards the outside of the rotor, during the rotor half-revolution following a maximum retraction position, when the blade transmits the driving torque to the rotation axis of the rotor, the flexible part only being driven under the effect of the flow of the fluid.

According to one embodiment, the flexible part has a width between half and one and a half times the radius of the rotor.

According to one embodiment, the flexible part has a width between one and one and a half times the radius of the rotor.

According to one embodiment, at least one of the blades is located on one side of a plane passing through a point of an inner longitudinal edge of the blade and the rotation axis, whereas the flexible part of the blade is located at least partly on the other side of this plane.

According to one embodiment, at least one of the blades comprises a rigid part and a flexible or rigid swiveling flap fixed along an outer longitudinal edge of the blade.

According to one embodiment, the blades are disposed around the rotation axis so that concave faces of the blades partially face one another.

According to one embodiment, the blades join along the rotation axis of the rotor.

According to one embodiment, at least one of the blades comprises a rigid inner part between inner and outer longitudinal edges of the blade, and an outer part fixed along the outer longitudinal edge of the inner part, the outer part being flexible or rigid and fixed onto the inner part by a flexible link.

According to one embodiment, each of the blades comprises a rigid inner part having in a plane perpendicular to the rotation axis a curved, flat or semi-circular profile.

According to one embodiment, each blade comprises a rigid central part, at least one of the blades having a flexible lateral part along its inner longitudinal edge, and at least one of the blades having a flexible lateral part along its outer longitudinal edge.

Some embodiments also relate to a wind turbine comprising a rotor as defined above.

Some embodiments also relate to an underwater generator comprising a rotor as defined above, the rotor being immersed in a liquid, the rotation axis of the rotor being substantially vertical.

According to one embodiment, the underwater generator comprises an electric generator coupled to the rotor and arranged above the rotor and the surface of the liquid.

BRIEF DESCRIPTION OF THE SEVERAL VIEWS OF THE DRAWINGS

Some examples of embodiments of the present invention will be described below in relation with, but not limited to, the accompanying figures, in which:

FIGS. 4A to 4C represent in a cross-section the rotor according to different directions in relation to the direction of flow of a fluid in which the rotor is immersed.

DETAILED DESCRIPTION OF THE INVENTION

Figure 1:
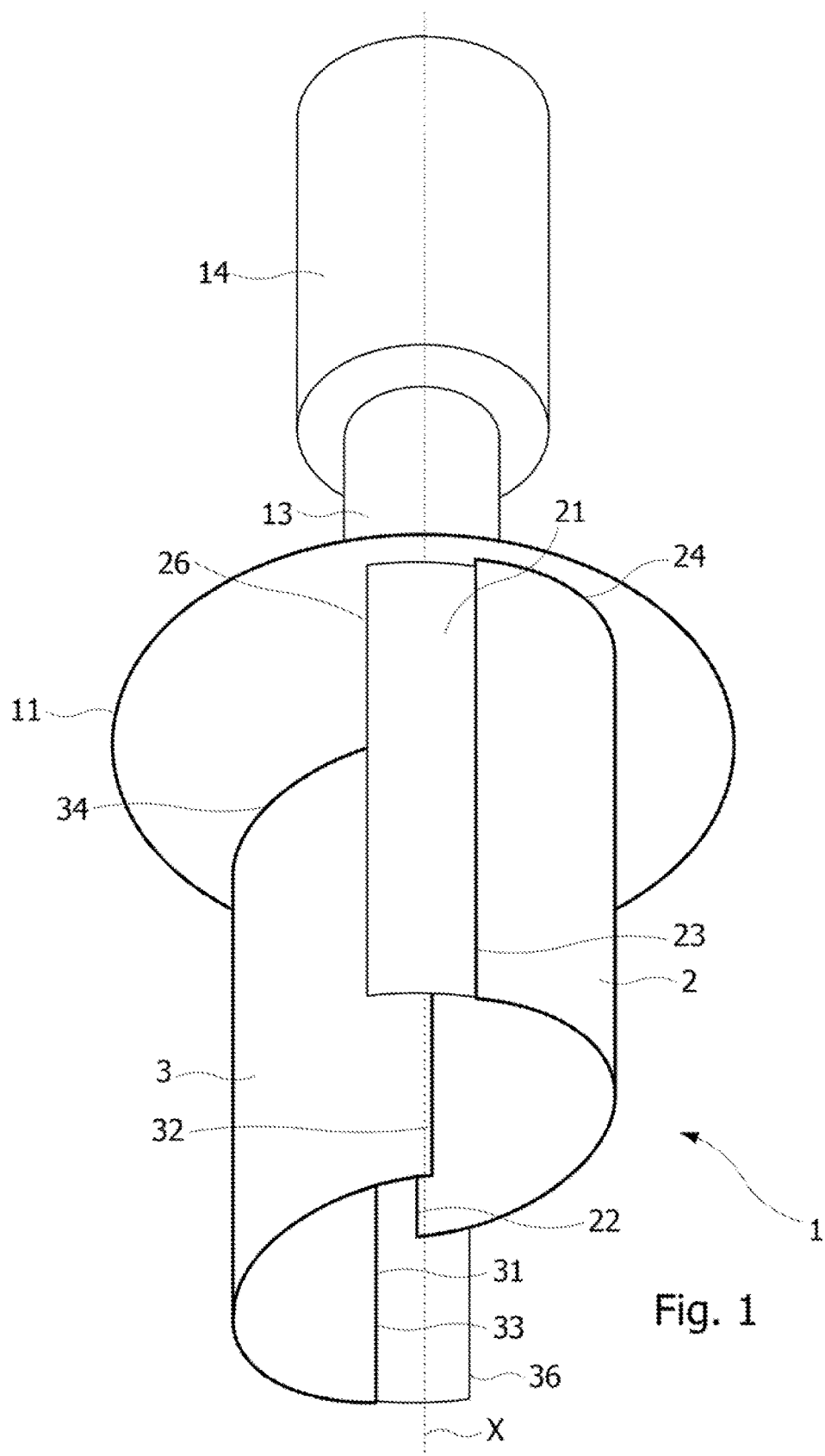
FIG. 1 is a perspective view of a rotor, according to one embodiment.
Figure 2:
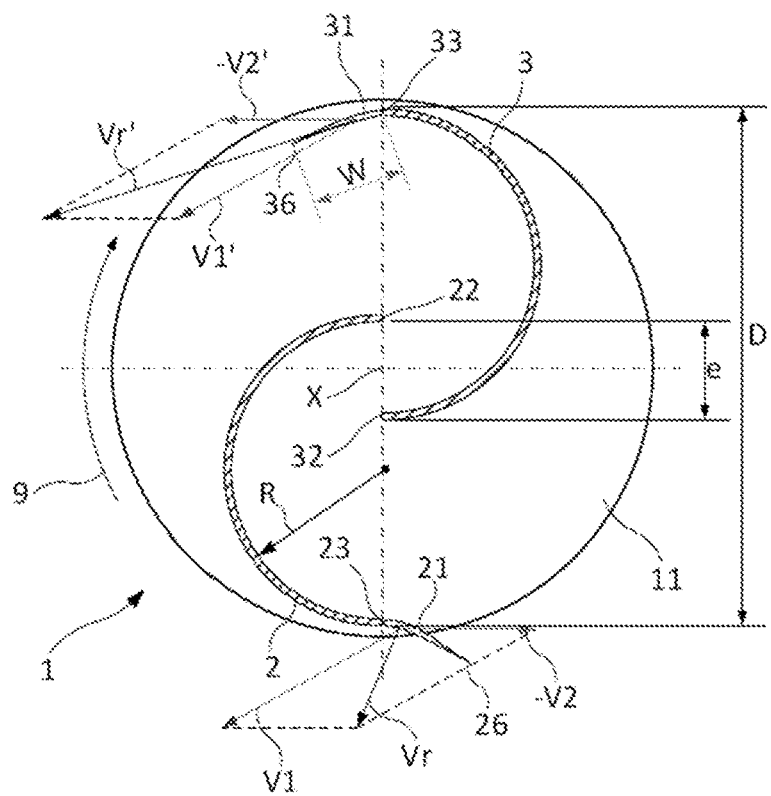
FIG. 2 is an axial cross-section of the rotor.
Figure 3:
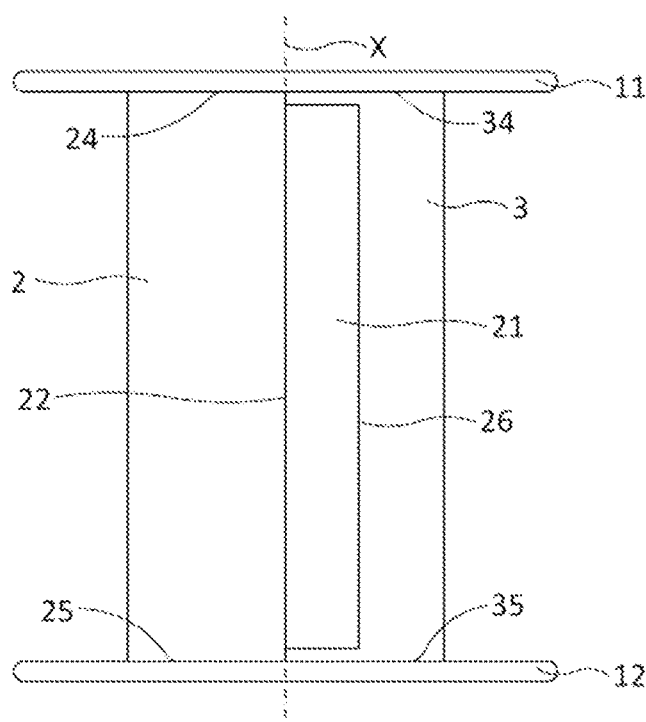
FIG. 3 is a lateral view of the rotor, according to one embodiment.

FIGS. 1, 2 and 3 represent a Savonius rotor 1 having a rotation axis X, and comprising blades 2, 3 uniformly spread around the axis X. Each of the blades 2, 3 has a curved profile in a plane perpendicular to the axis X, with a concave face, a convex face, an inner longitudinal edge 22, 32 close to the axis X of the rotor and an outer longitudinal edge 23, 33 further from the axis X than the inner longitudinal edge 22, 32. The blades 2, 3 may be fixed by a transverse edge 24, 34 on a plate 11, for example in the form of a disk, perpendicular to the axis X, or by opposite transverse edges 24, 25, 34, 35, between two flanges 11, 12, for example in the form of a disk, perpendicular to the axis X (FIG. 3). The blades 2, 3 may be fixed onto the plate 11 or between the flanges 11, 12 so that the axis X is between the inner 22, 32 and outer 23, 33 longitudinal edges of each blade 2, 3. The plate 11 may be coupled to the rotor of an electric generator 14 (FIG. 1), either directly through a shaft 13 coaxial to the axis X, or through a mechanical multiplier.

Whatever the direction of movement in a plane perpendicular to the rotation axis X, of the fluid in which it is immersed, the rotor 1 rotates in a same direction indicated by the arrow 9 on FIG. 2.

The rotor 1 may be used in any fluid, such as air and/or water, or even a complex fluid such as a liquid topped with a gas, or a liquid mixed with solid particles, with its rotation axis X arranged in any direction, except for the direction of flow of the fluid, for example vertically or horizontally. In water (or another liquid), only the rotor 1 may be immersed with its rotation axis substantially vertical, by keeping the generator 14 above water. Thus, it is possible to dispose the rotor 1 coupled to a generator by preventing an interface between two mobile parts in relation to each other from being immersed. It shall be noted that in the sea if the rotor is floating, in the presence of swell in particular, the axis X of the rotor may vary significantly around the vertical, for example between [−30°, +30°] in relation to the vertical, without the performance of the rotor being impacted. It is thus not necessary for the direction of flow of the fluid to be fixed and perpendicular to the rotation axis of the rotor.

According to one embodiment, a flexible flap 21, 31 is fixed onto the outer longitudinal edge 23, 33 of each blade 2, 3, so as to be able to freely orient itself under the effect of the flow of the fluid in the vicinity of the edge 23, 33. Each flap 21, 31 may extend along the entire outer longitudinal edge 23, 33 of the blade 2, 3 or only along one part of this edge, or be divided into several sections fixed onto the edge 23, 33 of the blade 2, 3. Indeed, it may be advantageous to make provision to divide the flaps into sections if the rotor might locally undergo variations in the intensity and/or in the direction of flow of the fluid. In this case, each flap section may be orientated between its totally extended and retracted positions, depending on the direction and intensity of the flow of fluid it undergoes. Provision may also be made to immerse the rotor in different superimposed layers of fluids, such as in water and air. In this case, the width and flexibility or displacement amplitude of each flap section may also be adapted to the density and viscosity of the fluid in which the flap section is intended to be immersed.

Each flap 21, 31 may extend up to a given distance from each flange 11, 12, so that their movements are not hindered by the flanges 11, 12. This arrangement may also reduce the risk of an object being trapped between the flap and the flange. The width W of each flap 21, 31 may depend on the flexibility of the flap. The angular displacement of the free edge 26, 36 of each flap 21, 31 may thus reach [120°, +120°] in relation to the direction of the tangent to the outer longitudinal edge 23, 33 of the blade where the flap is fixed. In addition, each of the flaps 21, 31 must not be capable of totally blocking an entry of the rotor by remaining pressed against the other blade under the effect of the force exerted by the fluid. The latter condition can be achieved with flaps that are sufficiently narrow or rigid so as not to remain pressed against the other blade for more than a half rotor revolution. Thus, the width W of each flap 21, 31 may be such that the flap may come into contact with the other blade in retracted position, provided it does not remain in this position for more than a half rotor revolution, or provided it tilts and remains in extended position for at least a half rotor revolution.

The width W of each flap 21, 31 may for example be between half and two times the radius of the rotor 1, depending on the rigidity of the flap. According to one embodiment, the width W of each flap 21, 31 is between one and one and a half times the radius of the rotor 1, depending on the rigidity of the flap. In this range, it is possible to double the performance of the rotor.

It shall be noted that the width W of each flap is not necessarily constant over the entire height of the blade 2, 3. Similarly, the radius of the blades 2, 3 is not necessarily constant over the entire height of the blades. Furthermore, the inner 22, 32 and outer 23, 33 longitudinal edges of each blade 2, 3 are not necessarily rectilinear and parallel to the rotation axis X, but may have any other shape, for example a helical shape around the axis X.

Each flap 21, 31 may be made of a flexible material, such as a resin or a woven or non-woven fabric, possibly coated with a resin. Each flap 21, 31 may be fixed onto the outer longitudinal edge 23, 33 of one of the blades 2, 3 by any means suited to the materials of which the blades 2, 3 and the flaps 21, 31 are made. Thus, each flap 21, 31 may be fixed onto one of the blades 2, 3 for example using glue, adhesive strips, screws, nails or rivets.

Figure 10:
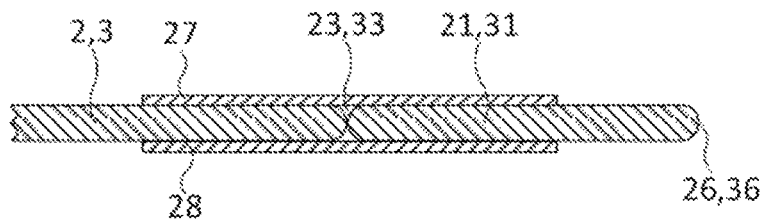
FIGS. 10 and 11 represent in a cross-section a part of a blade in the vicinity of the outer longitudinal edge of the blade.

The flaps 21, 31 may also be rigid and fixed onto the edges 23, 33 of the blades 2, 3 by a flexible link forming a hinge with a limited displacement to prevent the flaps from turning back and pressing against another blade. Thus, FIG. 10 represents in a cross-section a blade 2, 3 in the vicinity of its outer longitudinal edge 23, 33. The flap 21, 31 is fixed onto the blade as an extension of the outer longitudinal edge 23, 33 of the blade, by strips or sheets 27, 28 fixed, for example by adhesion, respectively onto the two faces of the blade and of the flap. The sheets 27, 28 may cover the entire flap and/or blade.

Each of the blades 2, 3 with its respective flap 21, 31 may also be made as a single piece, for example by molding, the flexibility of the part corresponding to the flap possibly being obtained by using different materials or by working on the thickness of the blade. The flexibility of the part corresponding to the flap 21, 31 may also result partially or totally from the position of the attachment points of the blade 2, 3 to the flanges 11, 12, the rigidity of the blade being partly conferred by the fact that it is fixed onto the flanges 11, 12, and the part corresponding to the flap not being fixed onto the flanges.

Figure 11:
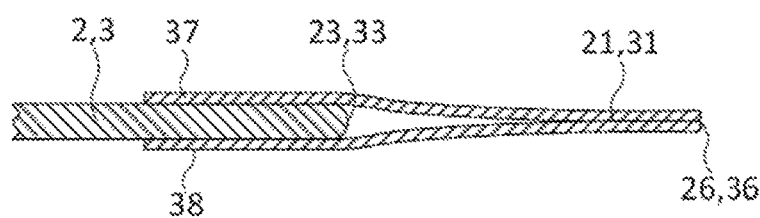

According to one embodiment, each blade 2, 3 has a rigidity that decreases from the inner longitudinal edge 22, 32 to the outer longitudinal edge 26, 36 of the flap part 21, 31. This decrease may be progressive or in one or more jumps, so that the part in the vicinity of the outer edge 26, 36 is flexible. Thus, FIG. 11 represents in a cross-section a blade 2, 3 in the vicinity of its outer longitudinal edge 23, 33. The flap 21, 31 is formed by two strips 37, 38 fixed, for example by adhesion, respectively onto the two faces of the blade along the outer longitudinal edge 23, 33 of the blade, so as to extend this edge and thus form the flap 21, 31 made up of the two strips 37, 38 fixed against each other at least in the vicinity of the outer longitudinal edge 26, 36 of the flap 21, 31.

In the example in FIGS. 1 to 3, the rotor 1 comprises two blades disposed symmetrically around the axis X, each blade having a semi-cylindrical shape (FIGS. 1 and 3) or a semi-circular profile in a plane perpendicular to the axis X (FIGS. 1 to 3). Each of the inner longitudinal edges 22, 32 of one of the two blades 2, 3 is between the inner and outer 22, 23, 32, 33 longitudinal edges of the other blade. The inner longitudinal edges 22, 32 are spaced out by a distance e that may be chosen equal to a quarter of the radius R of each blade 2, 3 or to one sixth of the diameter D of the rotor 1, the diameter D corresponding to the distance between the outer longitudinal edges 23, 33 of the two blades 2, 3. Furthermore, in the example in FIGS. 1 and 3, the edges 22, 32 and 23, 33 are parallel to the axis X.

During the rotation of the rotor 1, the flexible flaps 21, 31 tend to be orientated in the direction and depending on the amplitude of the apparent velocity of the fluid. This apparent velocity is defined by a velocity vector Vr, Vr' corresponding to the vector difference of a velocity vector V1, V1' amplitude- and direction-linked to the flow velocity of the fluid in the vicinity of the flap 21, 31, and of a velocity vector V2, V2' having an amplitude linked to the linear velocity of the longitudinal edge 23, 33 and a direction tangential to the blade 2, 3 towards the inside of the blade in the region of the longitudinal edge 23, 33. It shall be noted that the velocity vector V1, V1' is also linked to the angular position of the rotor 1 in relation to the direction of flow of the fluid corresponding to the direction of the vectors V1, V1'. Indeed, in a region downstream from the rotor 1 in relation to the direction of flow of the fluid, the flap 21, 31 undergoes no or little yield force of the fluid. Upon the start of the rotor 1 and until the linear velocity of the flaps 21, 31 in rotation around the axis X reaches the flow velocity of the fluid, the apparent velocity vector Vr, Vr' in the vicinity of each of the flaps 21, 31 may have any direction. When their linear velocity becomes higher than that of the fluid, the apparent velocity vector Vr, Vr' is directed in an angular sector centered on the direction tangential to the blade 2, 3 towards the outside in the region of the longitudinal edge 23, 33 (direction of the velocity vector V2 on FIG. 2), and limited to [−90°, +90°]. However, it shall be noted that the optimal linear velocity of the outer edge 23, 33 of each blade of a Savonius rotor is between 0.5 and 0.7 times the flow velocity of the fluid.

FIGS. 4A to 4C represent the blades 2, 3 and the direction of the apparent velocity vector Vr, Vr' of the fluid, in different configurations which can arise during a revolution of the rotor 1, in the event that the linear velocity of the flaps 21, 31 (or of the outer edges 23, 33) is lower than the flow velocity of the fluid. Over substantially a half revolution of the rotor 1, the apparent velocity vector Vr in the vicinity of the flap 21 is directed towards the outside of the rotor 1, whereas in the vicinity of the flap 31, this apparent velocity vector Vr' is directed towards the inside of the rotor (FIGS. 4B, 4C). Over the other half revolution of the rotor 1, the directions of the apparent velocity vectors Vr, Vr' in the vicinity of the two flaps 21, 31 are inverted (FIG. 4A). Furthermore, when the linear velocity V2, V2' of the flaps 21, 31 is lower than the flow velocity of the fluid V1, the apparent velocity vector may be directed in a direction susceptible of causing the flap 21 to turn back, i.e. having a component in the direction of the vector V2, V2', having a direction opposite the latter. Thus, on FIG. 4A, the velocity vector Vr is susceptible of turning back the flap 21 towards the inside of the rotor 1. On FIG. 4B, the velocity vector Vr is susceptible of turning back the flap 21 towards the outside of the rotor 1. Switching from the configuration of FIG. 4A to that of FIG. 4B causes the flap 21 to tilt from the inside towards the outside.

When one of the two flaps 21 undergoes a fluid apparent velocity Vr directed towards the outside of the rotor 1 (FIG. 4B), it tends to extend (towards the outside of the rotor 1) and thus to increase the front surface S1 of the blade 2, against the flow of the fluid (surface projected onto a plane perpendicular to the direction of flow of the fluid). It can be also noted that this extension occurs when the blade has its concave face against the flow of the fluid. The result is an increase in the driving torque transmitted by the blade 2 to the rotation axis X of the rotor, tending to rotate the rotor 1. Conversely, when one of the two flaps 31 undergoes a force towards the inside of the rotor 1, it tends to retract (towards the inside of the rotor 1) and thus to reduce the front surface S2 (lower than S1) of the blade 3 against the flow of the fluid. It can be also noted that this retraction occurs when the blade has its convex face against the flow of the fluid. The result is a decrease in the resistant torque exerted by the blade 3 (compared to the one that the blade would have if its flap remained in extended configuration), during a phase when it tends to go against the rotation of the rotor 1.

Figure 5:
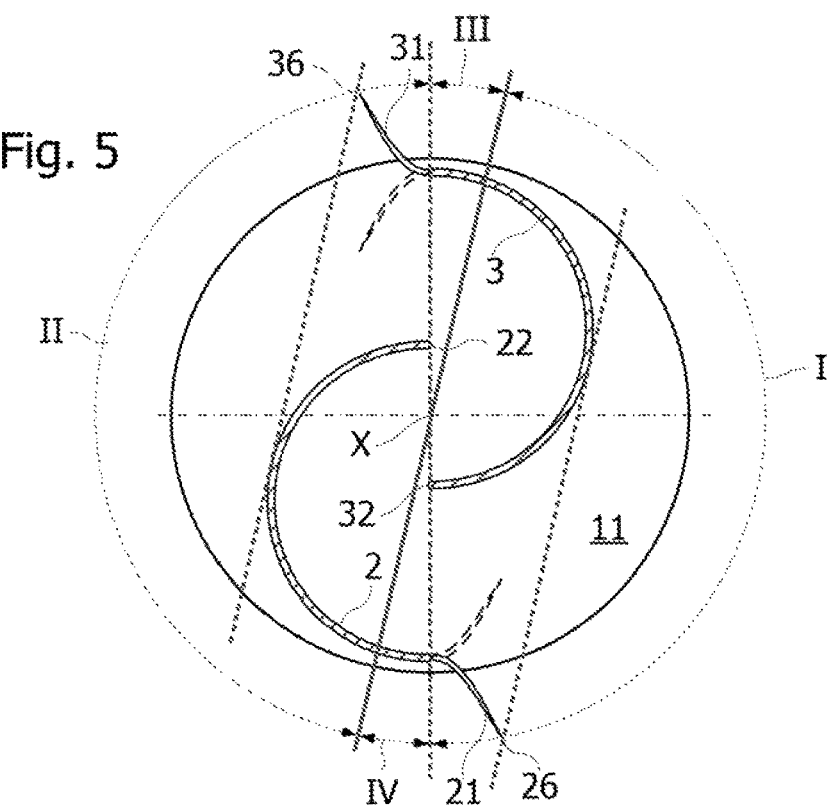
FIG. 5 is an axial cross-section of the rotor and shows different phases of action of the blades on the rotation of the rotor depending on the direction of flow of a fluid in which the rotor is immersed.

FIG. 5 represents different operating phases I to IV of the rotor 1 depending on the direction of flow of the fluid, in a reference system linked to the rotor. The different phases I to IV thus correspond to angular sectors of incidence of the fluid flow on the rotor 1. During phase I, the blade 2 receives the fluid on its concave face and thus exerts a driving torque on the rotor 1. During this phase, the blade 3 receives the fluid on its convex face and thus exerts a resistant torque on the rotor. During phase II, the respective roles of the blades 2, 3 are inverted. Thus, the blade 3 exerts a driving torque on the rotor, whereas the blade 2 exerts a resistant torque. Phases I and II are thus alternately driving and resistant phases for each of the blades 2, 3. Phases III and IV between phases I and II delimit "dead" angular sectors, in which the fluid does not engage the concave face of any of the blades 2, 3. In reality, the blades continue to exert a low driving torque during phases III and IV.

Figure 6:
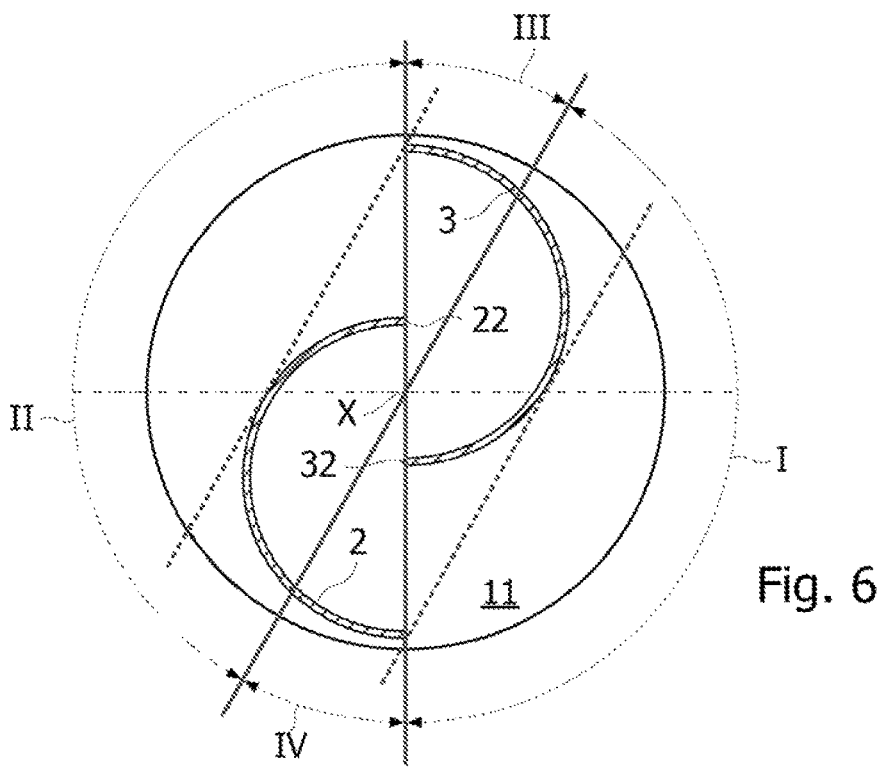
FIG. 6 is an axial cross-section of a conventional Savonius rotor and shows different phases of action of the blades on the rotation of the rotor depending on the direction of flow of a fluid in which the rotor is immersed.

As a comparison, FIG. 6 represents the different operating phases I to IV of a conventional Savonius rotor. It appears that the "dead" angular sectors corresponding to the phases III and IV are less extended on FIG. 5 than on FIG. 6, thanks to the presence of the flexible flaps 21, 31.

It shall be noted that the flexible parts and the flaps that have just been described are automatically directed in relation to the blades, under the effect of the flow of the fluid, without the need for active means to orient the flexible parts and the flaps. It shall also be noted that the flexible parts or the flaps are located further away from the rotation axis X than the blades. As a result, in extended position, the forces they receive from the flow of the fluid produce a driving torque proportionately higher (depending on the distance between the point of application of the force and the rotation axis X) than the driving torque exerted by the driving blade. The present invention thus improves the performance of the rotor, using simple means and thus at a relatively low cost.

It will be understood by those skilled in the art that the present invention is susceptible of various alternative embodiments and various applications. In particular, the present invention also covers a rotor with only one blade equipped with a flexible part. It is not necessary either for the flexible part to retract into the rotor when the blade exerts a resistant torque on the rotor. It is merely important that the flexible part can extend when the blade exerts a driving torque, and retract along the tangent to the outer longitudinal edge of the blade, when the blade exerts a resistant torque.

The present invention is not limited either to a rotor comprising semi-cylindrical blades and flaps extending the outer edges of the blades. Thus, FIGS. 7A to 7E have rotor profiles according to various other embodiments.

Figure 7A:
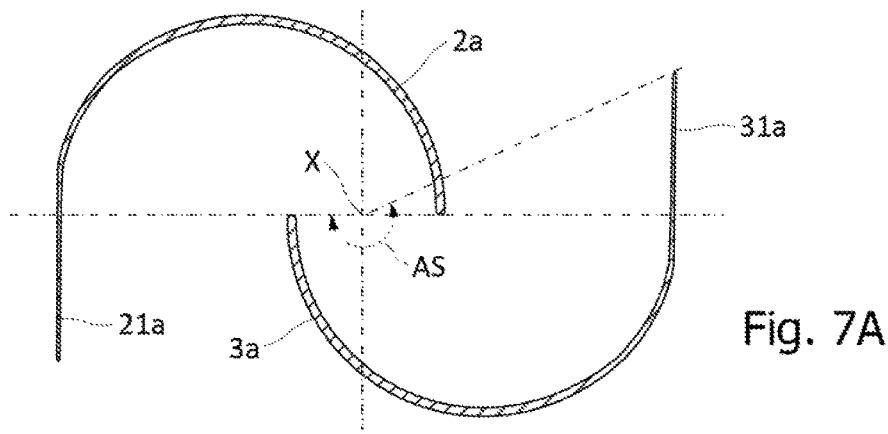
FIGS. 7A to 7E are axial cross-sections of rotors according to various other embodiments.
Figure 7B:
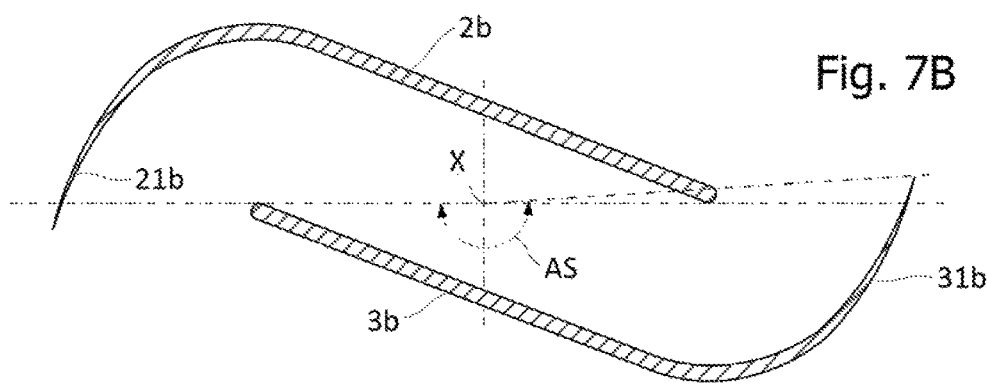
Figure 7C:
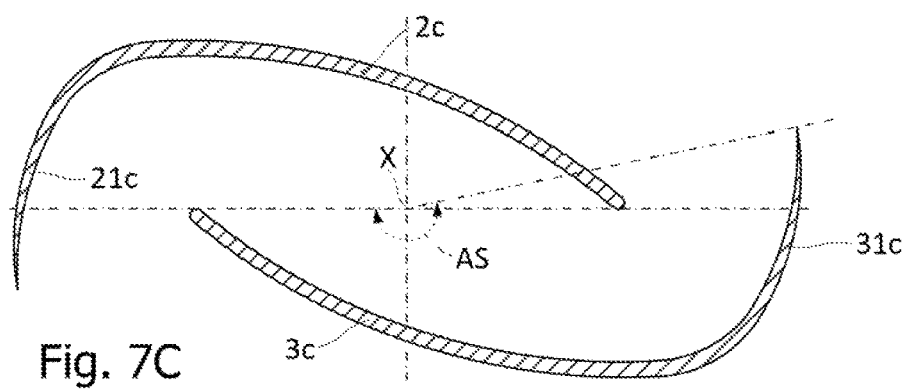
Figure 7D:
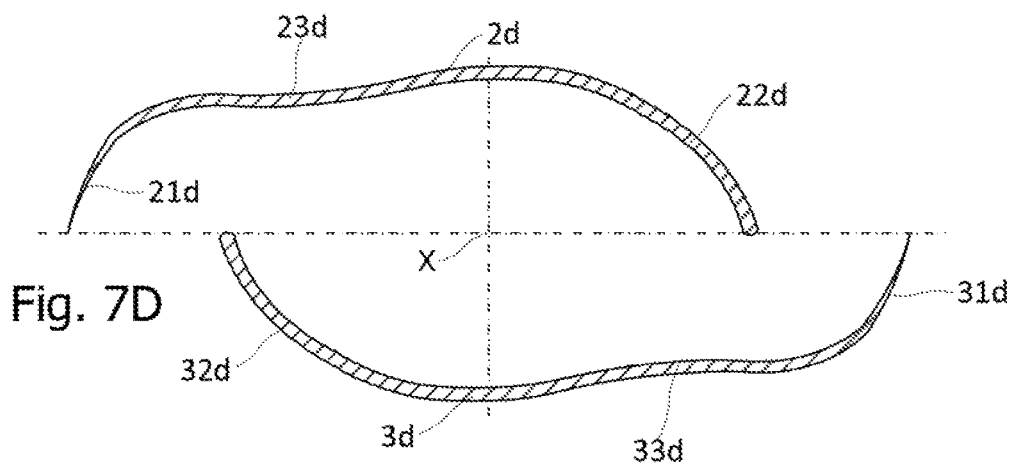

On FIG. 7A, the blades 2a, 2b are formed as a single piece with a rigid inner part having a semi-circular profile in a plane perpendicular to the axis X, and a flexible extension 21a, 31a of the outer edge (in relation to the axis X of the rotor) of the internal part. On FIG. 7B, the blades 2b, 3b are flat and disposed opposite one another, each blade comprising an edge integral with a flexible extension 21b, 31b. On FIG. 7C, the blades 2c, 3c differ from those of FIG. 7B in that the flat part of each blade is replaced with a slightly curved part with a concave face on the side of the axis X of the rotor. The flexible parts 21c, 31c of the blades 2c, 3c are substantially identical to the flexible parts 21b, 31b. On FIG. 7D, the profile or the section of each blade 2d, 3d in a plane perpendicular to the axis X of the rotor has a more complex shape, comprising an inner part 22d, 32d (in relation to the axis X of the rotor) substantially describing a quarter circle, followed by a slightly convex part 23d, 33d facing the axis X, and by a flexible part 21d, 31d partly bypassing the inner longitudinal edge of the other blade.

According to one embodiment, all or part of the flexible part of each blade of the rotor extends on one side of a plane passing through a point of the inner longitudinal edge of the blade and the rotation axis of the rotor, whereas the blade is on the other side of this plane (FIGS. 1, 2, 7A to 7C). In other words, each blade surrounds the axis X of the rotor over an angular sector AS greater than 180°. In the example in FIG. 7D, each blade surrounds the axis X of the rotor over an angular sector close to 180°.

Figure 7E:
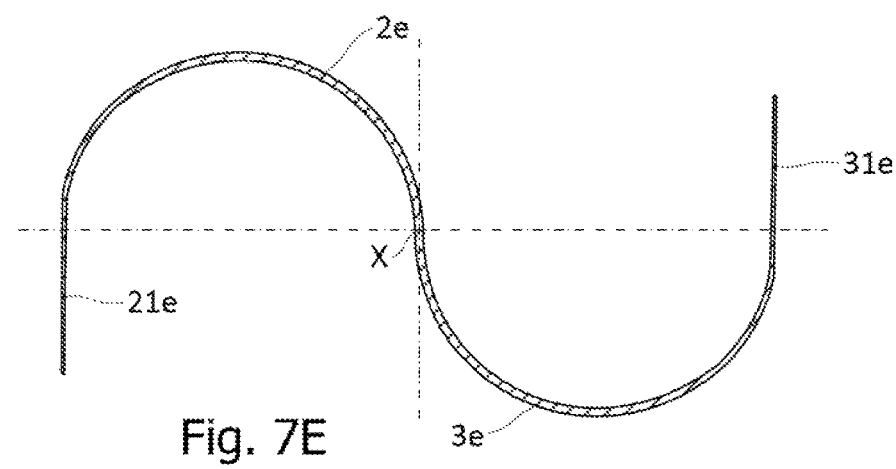

Furthermore, it is not necessary either for the blades of the rotor to be fixed onto the support 11 so that the axis X of the rotor is located between the inner and outer longitudinal edges of each blade. Indeed, the inner longitudinal edges of all the blades of the rotor may join in the region of the axis X of the rotor, as shown by FIG. 7E. In this figure, each of the blades 2e, 3e have substantially a same profile as those in FIG. 7A with flexible outer parts 21e, 31e, but inner longitudinal edges joining in the region of the axis X of the rotor. This arrangement particularly prevents an object from being trapped between the blades.

Figure 8:
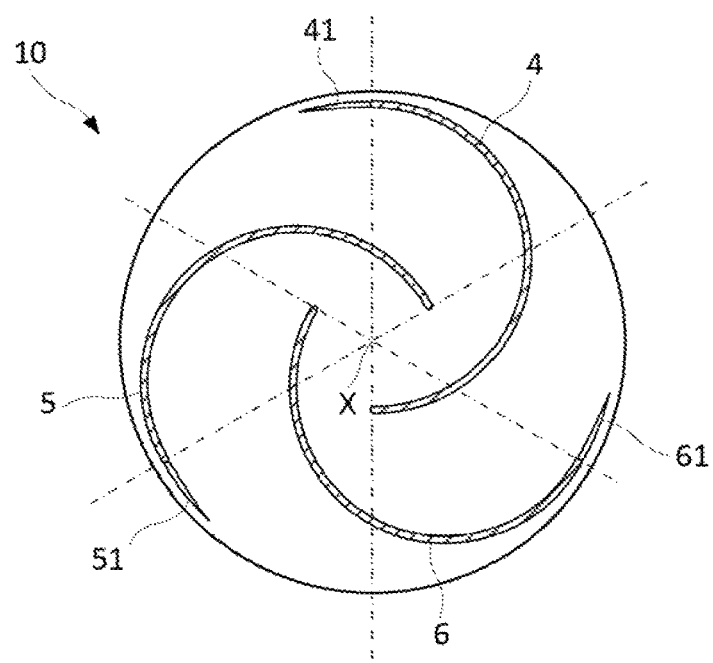
FIGS. 8 and 9 are axial cross-sections of rotors according to other embodiments.
Figure 9:
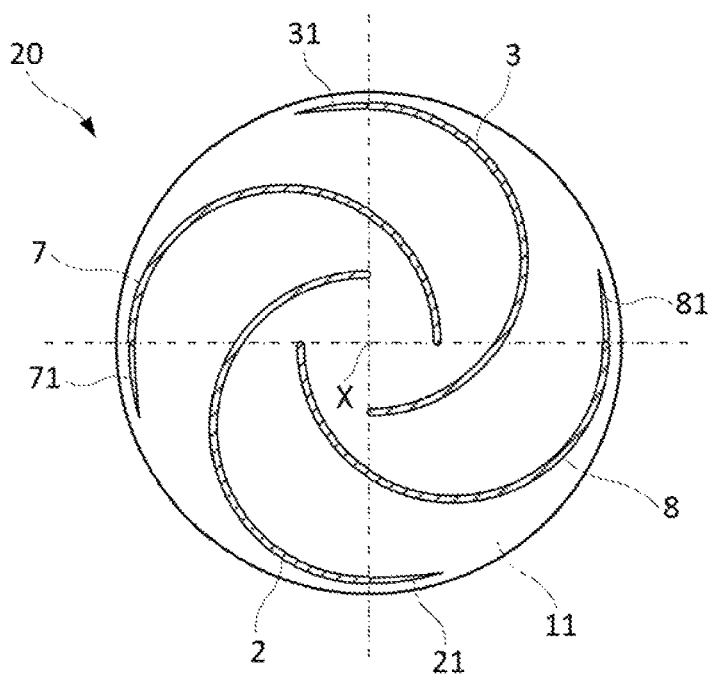

The present invention is not limited either to a two-blade rotor, but also covers rotors with three or more blades, each blade having a flexible outer part. Thus, FIG. 8 represents a rotor 10 with three blades 4, 5, 6 having a semi-circular profile, spread uniformly around the rotation axis X of the rotor 10, and comprising a flexible part 41, 51, 61 extending the semi-circular profile towards the outside of the rotor. FIG. 9 represents a rotor 20 with four blades 2, 3, 7, 8 disposed symmetrically around the axis X of the rotor 20, i.e. comprising two additional blades 7, 8 compared to the rotor 1. A flexible part 21, 31, 71, 81 extends the semi-circular profile of each blade 2, 3, 7, 8 towards the outside of the rotor.

In the case of blades in a single piece with a rigid part and a flexible part, only a transverse edge of the rigid part is fixed onto the flange 11, or only the transverse edges of the rigid part of each blade are fixed onto the flanges 11, 12. The transverse edges of the flexible parts are not fixed onto the flanges 11, 12.

Figure 12:
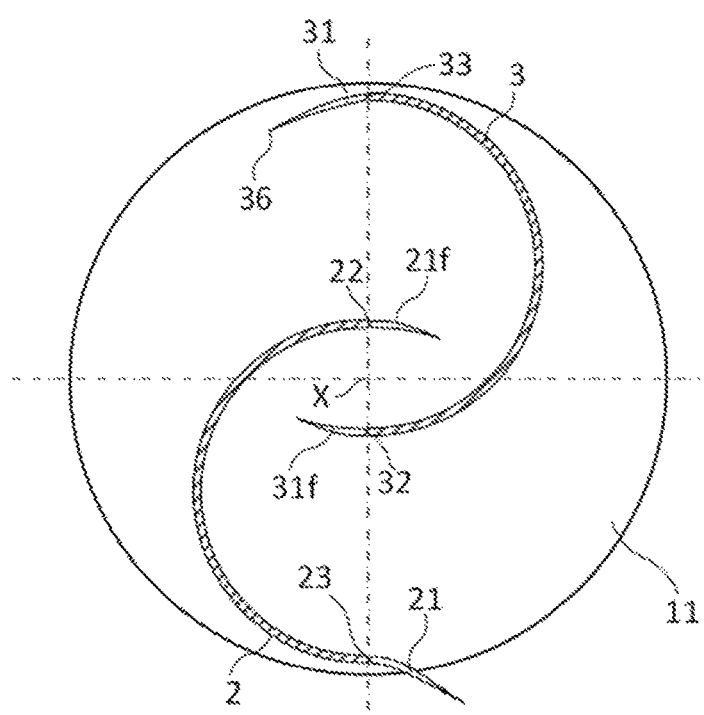
FIG. 12 is an axial cross-section of the rotor, according to another embodiment.

In addition, in the case of blades having regions of different rigidity, the rigid region of one of the blades does not necessarily extend from its inner longitudinal edge to the flexible part of the blade in the region of its outer longitudinal edge. Indeed, provision may be made for the region 21f, 31f of the inner longitudinal edge of one of the blades to be flexible, as shown in FIG. 12. Thus, the region 21f, 31f of the inner longitudinal edge of the blade may also retract or extend depending on the concave or convex face of the blade that is against the flow of the fluid. In this case, the transverse edges of the region 21f, 31f of the inner longitudinal edge of the blade are not fixed onto the flanges 11, 12 either. Thus, only the transverse edges of a central region of the blade may be fixed onto one or two flanges.

The present invention is not limited either to cylindrical blades, but also covers blades having other shapes, such as a helical shape, particularly to prevent variations in the driving torque exerted by each of the blades during the rotation of the rotor. In this case, the flaps or the flexible parts may be divided into sections which can extend and retract individually according to the driving or resistant torque exerted by the blade section to which it is linked. It shall also be noted that a rotor with helical blades may be rotated even though the rotation axis of the rotor is arranged in the direction of flow of the fluid.

The present invention also covers all the possible combinations of the embodiments described and in particular those represented in FIGS. 1, 2, 7A to 7E, 8 and 9.

The invention claimed is:

1. A rotor comprising:
    at least two rotor blades configured to rotate around a rotation axis, each of the at least two rotor blades having an outer longitudinal edge and an inner longitudinal edge, each of the at least two rotor blades being configured to alternately transmit to the rotation axis, during a revolution of the rotor around the rotation axis and under a fluid flow, (i) a driving torque that rotates the rotor around the rotation axis, and (ii) a resistant torque that acts against the rotation of the rotor around the rotation axis; and
    a plurality of flexible parts, each flexible part of the plurality of flexible parts being fixed to each outer longitudinal edge of the at least two rotor blades, each of each flexible part of the plurality of flexible parts having a width between half and one and a half times a radius of the rotor without 3 the plurality of flexible parts, each flexible part of the plurality of flexible parts being configured to:
  retract towards the rotation axis in a maximum retracted position when one rotor blade of the at least two rotor blades, transmits the resistant torque to the rotation axis, and
  extend away from the rotation axis in a maximum extended position, during a rotor half-revolution following the maximum retracted position, when the one rotor blade of the at least two rotor blades, transmits the driving torque to the rotation axis, the plurality of flexible parts only being driven by the fluid flow between the maximum retracted position and the maximum extended position.

2. The rotor according to claim 1, wherein the one rotor blade of the at least two rotor blades is disposed on a first side of a first plane passing through a point of the inner longitudinal edge of the one rotor blade of the at least two rotor blades and the rotation axis, and a flexible part of the plurality of flexible parts fixed to the one rotor blade of the at least two rotor blades is disposed at least partly on a second side of the first plane.

3. The rotor according to claim 1, wherein at least one flexible part of the plurality of flexible parts includes a flexible swiveling flap fixed along the outer longitudinal edge of the one rotor blade of the at least two rotor blades.

4. The rotor according to claim 1, wherein the at least two rotor blades are disposed around the rotation axis such that concave faces of each rotor blade of the at least two rotor blades partially face each other.

5. The rotor according to claim 1, wherein the at least two rotor blades join along the rotation axis.

6. The rotor according to claim 1, wherein the one rotor blade of the at least two rotor blades includes a rigid inner part, and one flexible part of the plurality of flexible parts being fixed along the outer longitudinal edge of the one rotor blade of the at least two rotor blades by a flexible link.

7. The rotor according to claim 1, wherein each rotor blade of the at least two rotor blades includes a rigid inner part having a curved, flat, or semi-circular profile in a plane perpendicular to the rotation axis.

8. The rotor according to claim 1, wherein each the rotor blade of the at least two rotor blades includes a rigid central part having inner and outer longitudinal edges, the one rotor blade of the at least two rotor blades having a flexible lateral part along the inner longitudinal edge of the rigid central part and a flexible lateral part along the outer longitudinal edge of the rigid central part.

9. The rotor according to claim 1, wherein:
  the one rotor blade of the at least two rotor blades is disposed on a first side of a first plane passing through a point of the inner longitudinal edge of the one rotor blade of the at least two rotor blades and the rotation axis, and
  and a flexible part of the plurality of flexible parts fixed to the one rotor blade of the at least two rotor blades is disposed at least partly on a second side of the first plane.

10. A wind turbine having a rotor, the rotor comprising:
  at least two rotor blades configured to rotate around a rotation axis, each of the at least two rotor blades having an outer longitudinal edge and an inner longitudinal edge, each of the at least two rotor blades being configured to alternately transmit to the rotation axis, during a revolution of the rotor around the rotation axis and under a fluid flow, (i) a driving torque that rotates the rotor around the rotation axis, and (ii) a resistant torque that acts against the rotation of the rotor around the rotation axis; and
  a plurality of flexible parts, each flexible part of the plurality of flexible parts being fixed to each outer longitudinal edge of the at least two rotor blades, each of each flexible part of the plurality of flexible parts having a width between half and one and a half times a radius of the rotor without the plurality of flexible parts, each flexible part of the plurality of flexible parts being configured to:
    retract towards the rotation axis in a maximum retracted position when one rotor blade of the at least two rotor blades, transmits the resistant torque to the rotation axis, and
    extend away from the rotation axis in a maximum extended position, during a rotor half-revolution following the maximum retracted position, when the one rotor blade of the at least two rotor blades, transmits the driving torque to the rotation axis, the plurality of flexible parts only being driven by the fluid flow between the maximum retracted position and the maximum extended position.

11. The wind turbine according to claim 10, wherein at least one flexible part of the plurality of flexible parts includes a flexible or rigid swiveling flap fixed along the outer longitudinal edge the rotor blade of the at least two rotor blades.

12. The wind turbine according to claim 10, wherein the at least two rotor blades are disposed around the rotation axis such that concave faces of each rotor blade partially face each another.

13. The wind turbine according to claim 10, wherein the at least two rotor blades join along the rotation axis.

14. The wind turbine according to claim 10, wherein:
  the one rotor blade of the at least two rotor blades includes a rigid inner part, and one flexible part of the plurality of flexible parts
  being fixed along the outer longitudinal edge of the one rotor blade of the at least two rotor blades by a flexible link.

15. The wind turbine according to claim 10, wherein each of the rotor blades of the at least two rotor blades includes a rigid inner part having a curved, flat, or semi-circular profile in a plane perpendicular to the rotation axis.

16. The wind turbine according to claim 10, wherein each of the rotor blades of the at least two rotor blades includes a rigid central part having inner and outer longitudinal edges, the one rotor blade of the at least two rotor blades having a flexible lateral part along the inner longitudinal edge and a flexible lateral part along the outer longitudinal edge.

17. An underwater generator having a rotor, the rotor being immersed in a liquid and comprising:
  at least two rotor blades configured to rotate around a vertical rotation axis, each of the at least two rotor blades having an outer longitudinal edge and an inner longitudinal edge, each of the at least two rotor blades being configured to alternately transmit to the rotation axis, during a revolution of the rotor around the rotation axis and under a fluid flow, (i) a driving torque that rotates the rotor around the rotation axis, and (ii) a resistant torque against the rotation of the rotor around the rotation axis; and
  a plurality of flexible parts, each flexible part of the plurality of flexible parts being fixed to each outer longitudinal edge of the at least two rotor blades, each of the plurality of flexible parts having a width between half and one and a half times a radius of the rotor without the plurality of flexible parts, each flexible part of the plurality of flexible parts being configured to:
- retract towards the rotation axis in a maximum retracted position when one rotor blade of the at least two rotor blades, to which the flexible part is fixed, transmits the resistant torque to the rotation axis, and
- extend away from the rotation axis in a maximum extended position, during a rotor half-revolution following the maximum retracted position, when the one rotor blade of the at least two rotor blades, to which the flexible part is fixed, transmits the driving torque to the rotation axis, the flexible parts only being driven by the fluid flow between the maximum retracted position and the maximum extended position.

18. The underwater generator according to claim 17, further comprising an electric generator coupled to the rotor and disposed above the rotor and above a surface of the liquid.

* * * * *